United States Patent [19]

Twilley et al.

[11] Patent Number: 4,869,855
[45] Date of Patent: Sep. 26, 1989

[54] METHOD OF MANUFACTURING MOLDED ARTICLES

[75] Inventors: Ian C. Twilley, Chester, Va.; Radcliffe W. Farley, Worcester, Pa.

[73] Assignee: Allied Signal Inc., Morristown, N.J.

[21] Appl. No.: 12,479

[22] Filed: Feb. 9, 1987

Related U.S. Application Data

[63] Continuation-in-part of Ser. No. 858,974, May 2, 1986, Pat. No. 4,663,225, and a continuation-in-part of Ser. No. 858,785, May 2, 1986, Pat. No. 4,812,283.

[51] Int. Cl.⁴ .................... B29C 45/14; B29C 59/16; B29C 43/52
[52] U.S. Cl. .................... 264/25; 264/119; 264/122; 264/126; 264/250; 264/257; 264/521; 264/544; 264/DIG. 65
[58] Field of Search ............ 264/109, 121, 120, 119, 264/122, 126, 248, 257, 263, 327, 328.1, 328.5, 232, 234, DIG. 64, DIG. 65, 22, 25, 250, 521, 544; 156/221, 228, 245

[56] References Cited

U.S. PATENT DOCUMENTS

| | | |
|---|---|---|
| 2,459,804 | 1/1949 | Francis . |
| 2,464,112 | 3/1949 | Francis . |
| 2,847,712 | 8/1958 | Pollard et al. .............. 264/328.4 |
| 3,443,007 | 5/1969 | Hardy ........................ 264/327 |
| 3,699,203 | 10/1972 | Oshima ...................... 264/134 |
| 3,879,019 | 4/1975 | Chapman ................... 264/22 |
| 4,195,112 | 3/1980 | Sheard ....................... 264/119 |
| 4,265,954 | 5/1981 | Romanek ................... 264/25 |
| 4,380,523 | 4/1983 | Lind .......................... 264/257 |
| 4,385,955 | 5/1983 | Doerfling ................... 264/257 |
| 4,417,931 | 11/1983 | Li .............................. 264/121 |
| 4,508,673 | 4/1985 | Stahl et al. ................. 264/327 |
| 4,568,581 | 2/1986 | Peoples ...................... 264/241 |
| 4,609,519 | 9/1986 | Pichard ...................... 264/125 |
| 4,664,705 | 5/1987 | Horton ....................... 264/257 |

FOREIGN PATENT DOCUMENTS

| | | |
|---|---|---|
| 0093393 | 9/1983 | European Pat. Off. . |
| 0148760 | 7/1985 | European Pat. Off. . |
| 0148762 | 7/1985 | European Pat. Off. . |
| 2096195 | 10/1982 | United Kingdom . |

Primary Examiner—James Lowe
Assistant Examiner—Jeremiah F. Durkin, II
Attorney, Agent, or Firm—Ken C. Decker; William N. Antonis

[57] ABSTRACT

Method for manufacturing a molded article, for use, for example as a fluid filter or as a preform for a structural composite, is prepared from a batt of nonwoven structural fibers and a binder material, such as binder fibers or a thermoresponsive resin. The batt is stabilized by exposing it to a temperature slightly below the melting point of the binder material, so that the binder material becomes tacky and bonds the fiber materials at the surface of the batt. By exposing the batt to the heat for only a few seconds, only the binder material at the surface of the batt bonds the structural fibers; the structural fibers within the batt remain unbonded. Accordingly, the batt is "skinned", so that it is stiff enough to be handled, but is still flexible enough that it can be molded into complex shapes. The molding is effected in a mold in which heated air is drawn through the batt to force it to assume the contours of the mold.

11 Claims, 3 Drawing Sheets

METHOD OF MANUFACTURING MOLDED ARTICLES

CROSS REFERENCES TO CORRESPONDING APPLICATIONS

This application is a continuation-in-part of U.S. patent application Ser. No. 858,974, filed May 2, 1986, now U.S. Pat. No. 4,663,225, and U.S. patent application Ser. No. 858,785, filed May 2, 1986, now U.S. Pat. No. 4,812,283.

BACKGROUND OF THE INVENTION

This invention relates to a method for manufacturing a molded article for use, for example, as a filter or as a preform for resin impregnation to form a structural composite.

U.S. patent application 858,974 discloses and claims a process for the manufacture of a fiber reinforced composite article. This composite article is manufactured from a nonwoven, airlaid batt, which is formed into a preform shape by molding before being injected with an appropriate resin to form the composite article. U.S. patent application 858,785 discloses a process in which a molded article is formed from an airlaid, nonwoven batt, which is then formed in a mold and can be used, for example, as a fluid filter. The nonwoven batts used in both processes are manufactured by techniques which are in general known to those skilled in the art, and the batts formed thereby may be pulled apart relatively easily. This is because, as the batt is formed, only the electrostatic forces between the fibers comprising the batt are relied upon to hold the batt together.

According to the above-identified application, a binder material is included in the batt which, upon being heated in an oven in which the batt was placed, at least partly melts the binder material, thus fusing the fibers in the batt, so that the batt could be handled. Although this process, in general, works well, it has been discovered that molding relatively thick batts into complex shapes was rendered difficult, because the batts had a tendency to buckle when they were molded into certain shapes. Accordingly, the batt became too stiff when the batt was heated until the binder material fused all the fibers in the batt, but the uncured batt was not stable enough to be molded and readily broke apart.

SUMMARY OF THE INVENTION

It has been discovered that a batt can be produced which is stable, and yet can be molded into complex shapes without buckling. This is effected by heating only the surface of the batt, so that the binder material at the surface fuses or bonds the fibers at the surface. The binder material within the batt is not heated above the temperature at which the binder material becomes tacky; accordingly, the fibers away from the surfaces of the batt remain unbonded. Accordingly, the exterior of the batt has been "skinned"; that is, a relatively stable skin has been formed on the surface of the batt to stiffen the surface, thereby stabilizing the batt to permit handling. On the other hand, the fibers within the batt have not been bonded; accordingly, these fibers remain pliable and can be easily molded.

BRIEF DESCRIPTION OF THE DRAWINGS

These and other features of the invention will become apparent from the following description, with reference to the accompanying drawings, in which.

DESCRIPTION OF THE PREFERRED EMBODIMENTS

Figure 1:
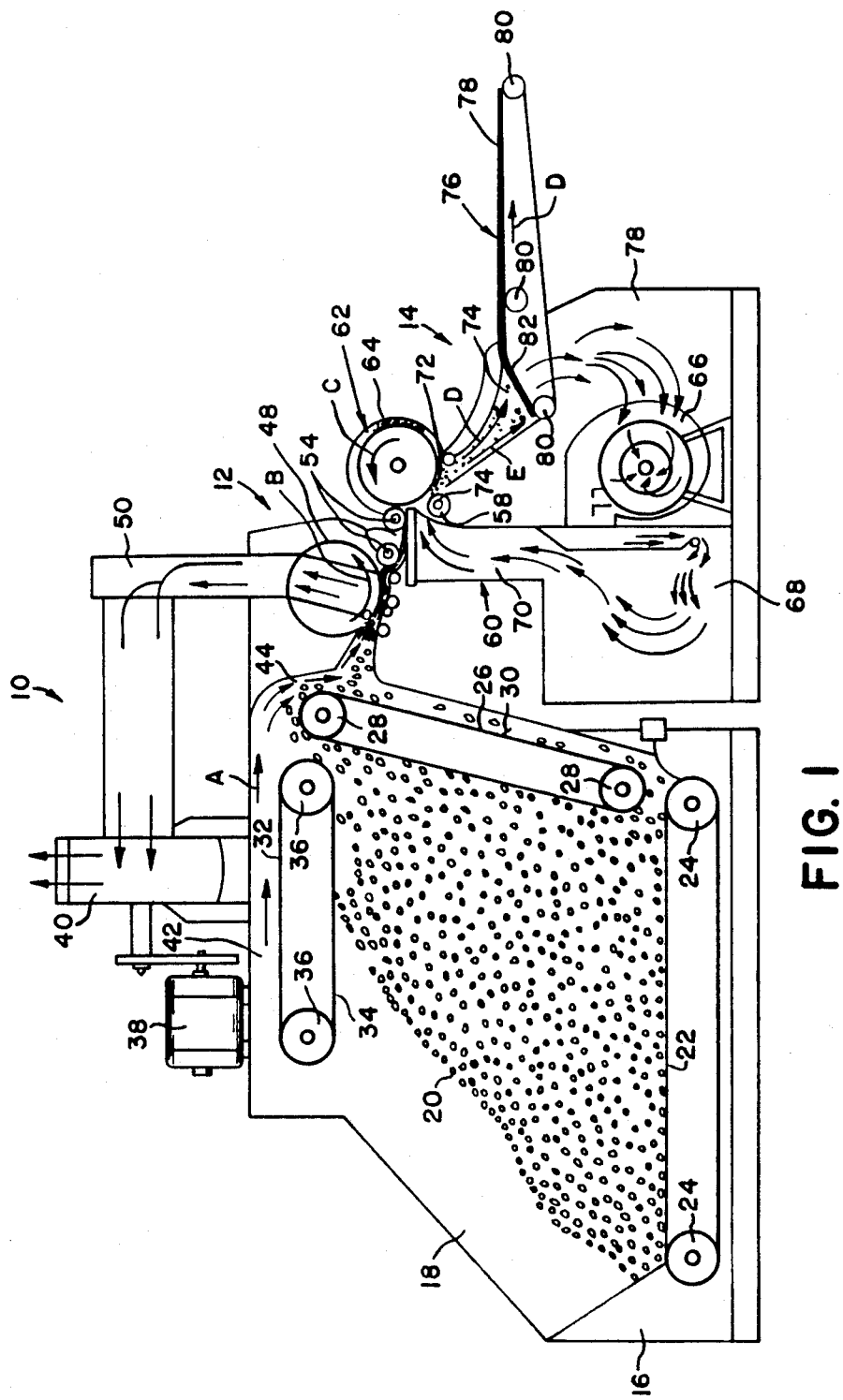
FIG. 1 is a cross-sectional view schematically illustrating an air laid nonwoven batt formation machine.
Figure 2:
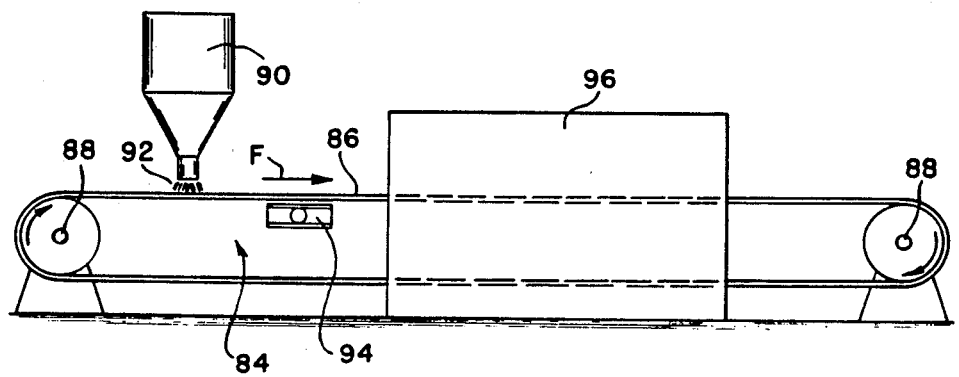
FIG. 2 is a view of the conveyer line which treats the batt formed by the machine illustrated in FIG. 1 as it is removed from the machine.

Referring now to the FIG. 1 of the drawing, an airlaid, nonwoven, batt-formation machine is generally indicated by the numeral 10 and is of the type generally illustrated in U.S. Pat. No. 3,918,126. The machine 10 is comprised of a feeding mechanism generally indicated by the numeral 12 and a web-formation mechanism generally indicated by the numeral 14.

Feeding mechanism 12 includes a housing 16 which encloses a relatively large hopper 18 which receives the fiber from which the web or batt is to be manufactured. Of course, the fibers are first opened and blended in the conventional manner before being placed in the hopper 18. The fiber mixture includes staple structural fibers such as curled or uncurled glass fibers, graphite fibers and/or high strength polyester. Also, thermoplastic fibers are included if the batt is not to be resinated with a thermoplastic material. In the preferred embodiment, the fibers in the hopper 18 are comprised of 52.5% curled fiberglass, available commercially from Owens-Corning Fiberglass Corporation; 17.5% COMPET polyester fiber, available commercially from Allied Corporation; and 30% of a thermoplastic, binder fiber know such as VINYON, available commercially from Celanese Corporation; or polyester fibers such as DACRON, available commercially from DuPont Corporation; or KODEL, available commercially from Eastman Kodak Company. The blended fibers are indicated by the reference numeral 20. A conveying apron 22 is mounted on rollers 24 located within the hopper 18 which are turned in the direction of the arrows by an appropriate power source (not shown), to move the fibers 20 to the right viewing FIG. 1 toward an elevating apron generally indicated by the numeral 26. The elevating apron 26 is mounted on rollers 28 located within the hopper and is provided with elongated spikes 30 extending therefrom. The rollers are operated by a power source such that the fibers are moved upwardly, viewing FIG. 1. A stripper apron 32 is provided with spikes 34 and is wrapped about rollers 36 which are also operated by a power source. A power source 38 operates a fan 40 which draws air through channel 42 defined between the stripper apron 32 and the upper wall of the housing 16, generally in the direction of the Arrow A. The metered airflow through the channel 42 removes a predetermined quantity of the fibers 20 from the elevating apron 26. The remaining fibers are returned to the hopper through channel 46, defined between the elevator apron 26 and the corresponding wall of the housing 16. The metered airflow indicated by Arrow A forces the fibers into a duct 44 defined between the upper edge of the elevating apron 26 and the corresponding wall of the housing 16.

The fibers are then consolidated into a feed mat 47 by the air flowing through the channel 42 and the duct 44. This air flow enters a cylindrical, porous condenser screen 48 which is rotated in the direction of the Arrow B by an appropriate power source (not shown). The air flow is ducted back to the blower 40 by ductwork generally indicated by the numeral 50. The rotating screen 48 compresses the feed mat 47 by cooperating with feed rollers 52, which cooperate with mechanical rolls 54 to advance the feed mat toward the mat formation mechanism, generally indicated by the numeral 14. The fibers are then brushed off nosebar 58 which is carried on housing 60 forming a part of the web formation mechanism 14 by a rotating lickerin generally indicated by the numeral 62. The lickerin 62 is provided with a serrated surface defining spikes or teeth 64 across the entire width and around the circumference of lickerin 62. The lickerin 62 is powered for rotation as indicated by the Arrow C.

The fibers are doffed from lickerin 62 by centrifugal forces generated by the rotating speed of the lickerin 62 and also by air flow provided by a blower 66. Blower 66 blows air into a chamber 68 defined within the housing 60 which is guided through a duct 70 and into a channel 72 defined between a saber 74 and the lickerin 62. The blended fibers are removed from the lickerin and are conveyed by the air stream through a duct 75 to a porous conveyer, generally indicated by the numeral 76. The inlet of the blower 66 is connected to a chamber 77 defined within the housing 60 which in turn in communicated to the duct 75 through the porous conveyor 76. The porous conveyor 76 includes a porous belt 78 mounted on rollers 80 which move the belt in the direction indicated by the Arrow D. Since the belt 78 is porous and permits air flow therethrough, the blower 66 is capable of circulating air through the channel 72, the duct 74, the chambers 77 and 68, and the duct 70. Accordingly, the fibers are doffed from the lockerin 62 and blown through the duct 74 and are condensed on a portion 82 of the porous belt 78 to form a nonwoven mat. Since the porous belt 78 is rotated around the rollers 80 the mat eventually exits from the portion of the belt covered by the duct 74.

The rotating speed of the lickerin 62 and the quantity of air pumped by the blower 66 may be adjusted in a conventional manner to adjust the weight of the batt formed by the web formation machine 10. Although lighter weight batts are acceptable, the invention prefers that relatively heavy batts, of a weight, for example, of four ounces/square yard or greater, are preferred because batts of this weight provide a sufficient quantity of fiber reinforcement for the structural composite to be manufactured as hereinafter described. It is also important that the fibers comprising the batt, which are randomly arrayed due to being blown through the duct 74, be sufficiently long that they cross each other a number of times, thereby providing relative attraction forces between the fibers so that each fiber can hold other fibers in place. It is preferred that fibers of at least one inch in length be used, since tests have shown that fibers of this length engage other fibers in the batt an average of three times, thus providing the number of engagements with other fibers necessary to form a satisfactory batt. Fibers of shorter length may be used, but they would, of course, engage other fibers, on average, fewer times, thus providing a batt with less integrity.

As discussed above, an important feature of the invention is that structural composites formed from the batts produced can have strength in all three spatial dimensions. The strength is provided by the reinforcement provided by the fibers used to make the composite. Accordingly, the nonwoven batt formed by the machine 10 will have randomly arrayed fibers which extend in all three spatial dimensions, since the random orientation of the fibers is a necessary consequence of the air formation process. However, it has been shown that the percentage of fibers arranged in the direction of the depth of the batt varies considerably, depending upon the direction of air flow through the duct 74. This direction is controlled by the spacing between the saber 74 and the lickerin 62. The saber 74 is mounted on an eccentric, so that its position relative to the lickerin, 62 is adjustable, thereby making the width of the channel 72 also adjustable. Normally, the saber 74 is spaced away from the lickerin 62 so that the air flow through the channel 72 tends to follow the shape of the channel in the direction of the Arrow D. While batts formed with air flow in this direction will have some fibers having components oriented in the direction of the depth of the batt, the majority of fibers will be oriented along the length and the width of the batt. However, it has been discovered that by moving the saber, 74 closer to the lickerin 62 and by adjusting the blower 66 accordingly, a venturi effect is created which deflects the air flow in the direction of the Arrow E. Batts formed in this manner have been found to have about 30% of their fibers having components oriented in the direction of the depth of the batt. Accordingly, a composite material formed from a batt having 30% of the fibers oriented in the depth direction will have almost the same strength in all three spatial dimensions.

The machine 10 has been described in accordance with the feeding mechanism 12. However, the purpose of the feeding mechanism 12 is to produce the feed mat 46 for the web formation mechanism 14. As is well know to those skilled in the art, the feed web may also be formed from a roller card and cross-lapping machine. This latter mechanism may be more efficient for a high volume production. Alternatively, the feed web may also be formed by a picker. This system may be more efficient for producing diversified, short-run lots.

The batt is transferred from the conveyor 78 onto an adjacent conveyor 84 which includes a porous belt 86 powered for rotation about rollers 88 in the direction indicated by the Arrow F. If the batt is to be resinated in lieu of using binder fibers or in addition to using binder fibers, an appropriate foamed resin is poured into the hopper 90 and is dispensed onto the batt traveling on the belt or conveyer 86 through nozzles 92. Since the belt 86 is porous, the foam can be pulled through the batt to saturate the same by applying a vacuum on the underside of the batt through the vacuum puller 94. The excess foam is pulled into the vacuum puller 94 and is recirculated into the hopper 90. The batt is then carried on the belt 86 through an oven 96.

The oven 96 is heated to a temperature of just just above the softening point of the thermoplastic binder fibers and/or resin. The oven 96 may, for example, contain a source of infra-red radiant energy to heat the surface of the batt above 200° F. It is assumed, of course, that the binder material is the same as those used in the examples set forth at the end of this specification.

The batt must be passed through the oven 96 in a relatively short time period, because, according to the invention, only the binder material at the surface of the batt is to be softened, thus bonding the structural fibers at the surface of the batt to form "skin" at the surface of the batt, while leaving the structural fibers within batt away from the surface thereof unbonded. Formation of a "skin" at the surface of the batt stabilizes the batt sufficiently to permit handling, yet the fact that the structural fibers within the batt remain unbonded permits the batt to remain relatively soft so that it can be molded without buckling. It has been found that if the batt is prepared pursuant to the examples given at the end of this specification are exposed to the aforementioned temperature for a time period of several seconds, that such a relatively thin skin will be formed on the batt, while leaving the bulk of the fibers of the batt unbonded. By leaving the batt within the oven for only a few seconds, the heat does not have time to penetrate the batt sufficiently to raise the temperature of the fibers away from the surface of the batt such that the binder fibers and/or binder material are raised to their stick points, that is, the point at which they become tacky.

As discussed hereinafter, an important feature of the invention is the fact that the batt is molded into a preform shape of the composite article before being impregnated with the appropriate resin. It is found that if the batt is molded while it is being impregnated, it is extremely difficult to assure complete saturation of the batt, particularly if the shape of the composite article to be formed is complex. Furthermore, the batt is also heated as it is molded into the preform, thus curing the batt and causing the thermoplastic binder fibers to at least partially melt and thereby hold the structural fibers in place. Accordingly, when the preform is injected with the resin matrix, the fibers of the preform resist deformation under the action of the resin being injected into them. Accordingly, the fibers remain in their structural skeleton position, thereby insuring a uniform concentration of fibers in the final product, to produce a consistent product of fairly uniform strength.

Figure 3:
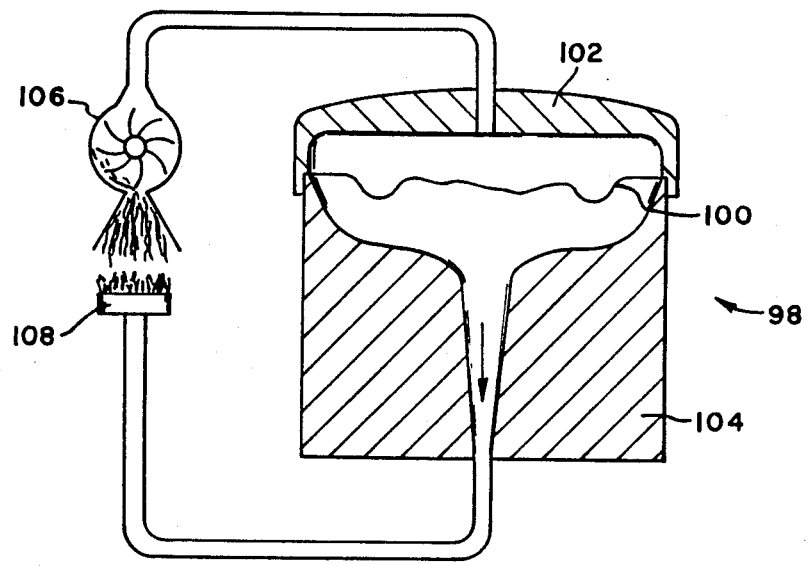
FIG. 3 is a cross-sectional view of a diagrammatic representation of a contour mold used to form the batt made by the machine of FIG. 1 into a preform shape.
Figure 4:
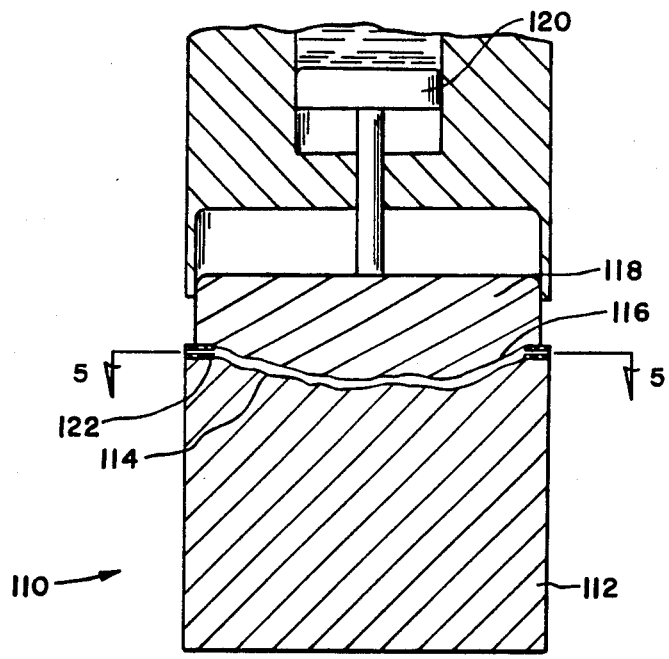
FIG. 4 is a cross-sectional view of a diagrammatic representation of a compression mold.
Figure 5:
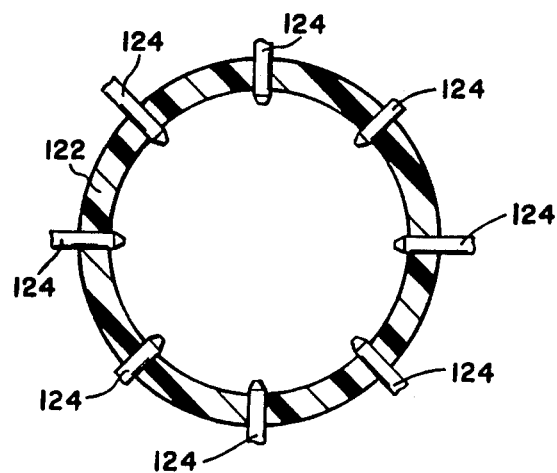
FIG. 5 is a perspective view of an article made by the process illustrated in FIGS. 1-4.

The preform is made in a preform contour mold, generally indicated by the numeral 98 in FIG. 3. The mold 98 is preferably a conventional through-air mold and includes a gas-permeable screen 100 which is contoured in the shape of the preform to be molded. A portion of the batt is placed on the screen 100 and the cover 102 of the mold is closed upon the body 104 thereof and a gas-impermeable seal is effected therebetween. A fan 106 circulates air in the direction of the Arrow X so that the batt is forced to assume the contours of the screen 100 by virtue of the gas being forced therethrough. Although air would normally be used, it is possible in certain applications that a gas other than air may be necessary. The gas being circulated through the mold is heated by a burner 108 to a temperature sufficient to melt the thermoplastic binder material (either the binder fibers or the resin applied to the batt), thereby causing the batt to fuse in a shape-retaining contour of the screen 100. In the preferred embodiment, in which VINYON is used as a binder fiber, the air would be heated to about 200° F., or about the sticking point of the binder fiber, that is, the temperature at which the fiber becomes tacky.

Of course, the stiffness of the batt will depend upon the percentage of binder fiber and/or thermoplastic resin used in the batt. A higher concentration of binder fiber will produce a stiffer preform, which can withstand a more viscous resin in the resin injection step. However, a higher concentration of binder fiber necessarily reduces the concentration of the structural fibers, so that the final product formed from a batt having a higher concentration of binder material will have inherently less strength than a batt formed with a lower concentration of binder material and a corresponding higher concentration of structural fibers. Furthermore, a higher concentration of binder material may cause excess undesirable shrinkage of the batt. It is also desirable that the batt not be excessively compressed as it is formed into the preform sheet. Accordingly, the open structure of the batt is retained, thereby facilitating saturation of the fibers by the resin matrix in the resin injection step. Although molds other than the through-air mold shown in FIG. 3, such as a conventional press type mold, may be used, care must be taken that the batt not excessively compressed, although some compression is unavoidable in forcing the batt to assume the complex contours of the mold.

The preform is then removed from the contour preform mold 98 and transferred to a conventional variable compression resin injection mold generally indicated by the numeral 110. Resin transfer mold 110 includes a base portion 112 which has a contoured shaped portion 114 which is the shape of the final composite article to be formed. The shape 114 is adapted to cooperate with a correspondingly shaped portion 116 of a cover member 118 which can be forced toward the portion 114 with a predetermined compressive force by a hydraulic actuator, indicated diagrammatically at 120. A parametrically extending gasket 122 is located at the periphery of the interface between the mold portions 112 and 118 and is provided with a circumferentially spaced resin injection jets 124. One of the jets 126 is selected as a drain port. The preform is placed on the mold portion 114 and the cover portion 118 is closed against the gasket 122. Preferably, the gap between the mold surfaces 114 and 116 is sufficiently great that the preform can be placed in the mold and the cover member 118 closed against gasket 122 without appreciably compressing the preform. An appropriate resin is then injected through jets 124 until the interstices between the fibers of the preforms are completely saturated with the resin and some of the resin begins draining out of the drain port 126. Although any of a number of resins are satisfactory, for example, EPON 828 resin available commercially from Shell Chemical Company may be used. As discussed above, it is preferred that the resin has a relatively low viscosity so that the batt need not be overly stiffened to prevent deformation under the action of the injection of the resin matrix. Accordingly, the resin is chosen has an inherently low viscosity at room temperatures, or the resin such as the aforementioned EPON 828 resin system can be heated to a temperature in which it has a sufficiently low viscosity. If necessary, the mold portions 118 and 112 can be heated to assist in curing the resin. As the peform becomes saturated with the resin (or after the preform has been saturated but before the resin is cured), the cover 118 is forced against the preform by action of the hydraulic actuator 120, thereby compressing the preform as it becomes saturated or immediately after it becomes saturated, thereby increasing the concentration of the structural reinforcing fibers to thereby increase the strength of the final product. Accordingly, the preform is initial of a relatively open structure, to permit easy saturation by the resin, but after the preform becomes saturated, the concentration of the fibers is increased by operation of the variable compression mold 110, to thereby mold the product to its final shape and to increase the concentration of the reinforcing fibers to produce na article that has acceptable strength.

The invention has been described in connection with the use of staple structural fibers for the manufacture of the air-laid nonwoven batt that forms the skeletal material for the fiber reinforced composite article, fibers in forms other than cut staple fibers may be used. For example, continuous filament tow may be used, and may be processed and blended as described in U.S. Pat. No. 4,514,880.

By way of illustration but not by way of limitation, the following examples are given, (all percentages are weight percent):

EXAMPLE 1

A nonwoven, air-laid batt was prepared, using 52.5% curled glass fiber, 17.5% COMPET fiber, and 30% of a polyester binder fiber known commercially as VINYON. The batt was molded into a preform as described above. The preform could then be impregnated with the appropriate resin as described above, and would have acceptable strength in all three spatial dimensions, while being relatively inelastic and having a relatively good impact strength.

EXAMPLE 2

A batt was prepared and treated as described above in Example 1 of the foregoing specification, but the batt was made from a mixture of 35% curled glass fibers, 35% COMPET fiber, and 30% VINYON. Composite materials made from this fiber would have somewhat greater impact strength than the composite materials prepared as in Example 1 because of the higher percentage of the COMPET fiber, but would have greater elasticity because of the lower percentage of glass fibers.

EXAMPLE 3

A nonwoven, air-laid batt was prepared above as in Examples 1 and 2, but consisted of a mixture of 70% curled glass fibers and 30% VINYON binder fiber. If the mat were impregnated with a resin as described above, the resulting composite would be relatively inelastic, and would compare to glass fiber structures already on the market. However, because of the absence of fibers having high impact strength, the impact strength of the resulting composite would be relatively low.

EXAMPLE 4

A nonwoven batt was prepared as discussed above in Examples 1-3, but instead consisted of a mixture of 50% curled glass fibers and 50% of the VINYON binder fiber. Because of the greater percentage of binder fiber, the resultant preform would shrink more than the preforms having the lower percentage of binder fibers, but the properties would otherwise be the same as in Example 3.

EXAMPLE 5

A batt was prepared as described above in Examples 1-4, but instead of using glass fibers and COMPET fiber, a fiber sold commercially under the trademark KEVLAR was used. The resulting batt and any preform or composite article which could be made therefrom would have the characteristics of the impact strength and elastic characteristics of the KEVLAR rather than of the glass fibers and/or COMPET fibers.

EXAMPLE 6

A batt was prepared pursuant to any of these Examples 1-5, but instead of using the VINYON binder fiber, the batt was made without using any binder and instead was resinated with polyvinyl acetate. Any batt made in this way would have similar characteristics to a batt containing corresponding percentages of glass fibers, COMPET, and/or KEVLAR as discussed above in Examples 1-5.

Though a number of specific embodiments and examples have been discussed in the foregoing specification, the invention is not limited to these examples and embodiments, but is instead limited only by the scope of the following claims.

We claim:

1. Method of manufacturing a molded article comprising the steps of forming a nonwoven batt from structural fibers and a thermally responsive binder material, causing the binder material at the surface of the batt to soften without applying forming pressure to the batt while maintaining the binder material away from the surface of the batt in its unsoftened state, permitting the softened binder material at the surface of the batt to at least partially bond the structural fibers at the surface of the batt while leaving the structural fibers away from the surface of the batt unbonded, and only thereafter applying forming pressure to the batt by placing the batt in a mold, and heating the batt while forcing the latter to assume the contours of the mold to mold the batt into the desired shape while causing the binder material within the batt to bond the structural fibers within the batt to one another.

2. Method manufacturing a molded article as claimed in claim 1, wherein the step of causing the binder material at the surface of the batt to soften is effected by placing the batt in an oven, applying radiant energy to the batt while the batt is in the oven, and removing the batt from the oven before the heat of the oven has penetrated into that portion of the batt away from the surface thereof.

3. Method of manufacturing a molded article as claimed in claim 2, wherein said batt is heated in said mold to a temperature and for a period of time sufficient to soften the binder material throughout the batt.

4. Method of manufacturing a molded article as claimed in claim 3, wherein the batt is both heated in said mold and forced to assume the contours of the mold by forcing heated air through the batt, said heated air forcing the batt to assume the contours of an air permeable member.

5. Method of manufacturing a molded article as claimed in claim 1, wherein the fibers at the surface of the batt are bonded sufficiently due to softening of the binder material to permit handling of the batt but a sufficient quantity of fibers within the batt are left unbonded when the fibers at the surface of the batt are bonded to permit molding of the batt without buckling of the batt.

6. Method of manufacturing a molded article as claimed in claim 5, wherein said step of causing the binder material at the surface of the batt to soften is effected by heating only the binder material at the surface of the batt to a temperature sufficient to at least partially melt the binder material by applying radiant energy to the batt while maintaining the binder material to be left unbonded at a temperature less than such temperature sufficient to at least partially melt the binder material.

7. Method of manufacturing a molded article as claimed in claim 1, wherein said step of causing the binder material at the surface of the batt to soften is effected by heating only the binder material at the surface of the batt to a temperature sufficient to at least partially melt the binder material by applying radiant energy to the batt while maintaining the binder material to be left unbonded at a temperature less than such temperature sufficient to at least partially melt the binder material.

8. Method of manufacturing fiber reinforced composites comprising the steps of forming a nonwoven batt from structural fibers and a thermally responsive binder material, causing the binder material at the surface of the batt to soften without applying forming pressure to the batt while maintaining the binder material away from the surface of the batt in its unsoftened state, permitting the softened binder material at the surface of the batt to at least partially bond the structural fibers at the surface of the batt while leaving the structural fibers away from the surface of the batt unbonded, permitting the fibers at the surface of the batt to bond sufficiently due to softening of the binder material to permit handling of the batt but leaving a sufficient quantity of fibers within the batt unbonded when the fibers at the surface of the batt are bonded to permit molding of the batt into said preform without causing the batt to buckle, only thereafter applying forming pressure to the batt to mold the batt into a preform while causing the binder material within the batt to bond the structural fibers within the batt to one another, heating the batt when the batt is molded into said preform to a temperature and for a period of time sufficient to soften the binder material throughout the batt, and thereafter injecting the preform with a resin matrix to fill the interstices between the fibers.

9. Method of manufacturing fiber reinforced composites as claimed in claim 8, wherein said step of causing the binder material at the surface of the batt to soften is effected by heating only the binder material at the surface of the batt to a temperature sufficient to at least partially melt the binder material by applying radiant energy to the batt while maintaining the binder material to be left unbonded at a temperature less than such temperature sufficient to at least partially melt the binder material.

10. Method of manufacturing fiber reinforced composites as claimed in claim 8 wherein said step of causing the binder material at the surface of the batt to soften is effected by heating only the binder material at the surface of the batt to a temperature sufficient to at least partially melt the binder material by applying radiant energy to the batt while maintaining the binder material to be left unbonded at a temperature less than such temperature sufficient to at least partially melt the binder material.

11. Method of manufacturing fiber reinforced composites as claimed in claim 8, wherein the step of molding the batt into said preform is effected by placing the batt in a mold, said batt being heated while being forced to assume the contours of the mold.

* * * * *